(12) United States Patent
Ye et al.

(10) Patent No.: US 11,979,354 B2
(45) Date of Patent: May 7, 2024

(54) ADAPTIVE APPLICATIONS OF ORTHOGONAL COVER CODES ON RESOURCE ELEMENTS FOR WIRELESS COMMUNICATION SYSTEMS

(71) Applicant: Apple Inc., Cupertino, CA (US)

(72) Inventors: Sigen Ye, Whitehouse Station, NJ (US); Wei Zeng, Saratoga, CA (US); Dawei Zhang, Saratoga, CA (US); Oghenekome Oteri, San Diego, CA (US); Haitong Sun, Cupertino, CA (US); Yushu Zhang, Beijing (CN); Chunxuan Ye, San Diego, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/441,253

(22) PCT Filed: Oct. 16, 2020

(86) PCT No.: PCT/CN2020/121614
§ 371 (c)(1),
(2) Date: Sep. 20, 2021

(87) PCT Pub. No.: WO2022/077471
PCT Pub. Date: Apr. 21, 2022

(65) Prior Publication Data
US 2023/0239101 A1    Jul. 27, 2023

(51) Int. Cl.
*H04L 5/00* (2006.01)

(52) U.S. Cl.
CPC .......... *H04L 5/0051* (2013.01); *H04L 5/0016* (2013.01)

(58) Field of Classification Search
CPC ... H04L 5/0051; H04L 5/0016; H04L 27/261; H04L 27/2607; H04L 5/0007;
(Continued)

(56) References Cited

U.S. PATENT DOCUMENTS 8,804,651 B2    8/2014 Li et al.
11,336,382 B2 *  5/2022 Saito ............... H04L 5/0016
(Continued)

FOREIGN PATENT DOCUMENTS

CN    102300313 A    12/2011
EP    3340515 A1     6/2018
(Continued)

OTHER PUBLICATIONS

NTT Docomo Inc.; "Views on CSI measurement for NR"; 3GPP Draft; R1-1720801, 3GPP TSG RAN WG1 Meeting #91, Reno, USA, Nov. 27-Dec. 1, 2017; 11 pages (Year: 2017).*
(Continued)

*Primary Examiner* — Brian T O Connor
(74) *Attorney, Agent, or Firm* — Sterne, Kessler, Goldstein & Fox P.L.L.C.

(57) ABSTRACT

Some aspects of this disclosure relate to apparatuses and methods for implementing designs for configurations of resource elements to carry reference signals for a user equipment (UE). A reference signal can be processed by the UE according to the configuration of resource elements to carry reference signals. The configurations can be determined by the base station, and received from the base station by the UE. The base station determines the configurations based on information or parameters provided by the UE, e.g., a coherence bandwidth of the channel, a coherence time of the channel, a preference associated with channel status information reference signal, or a preference associated with demodulation reference signal for the UE.

20 Claims, 10 Drawing Sheets

(58) Field of Classification Search
CPC . H04L 27/2636; H04L 5/0023; H04L 5/0053; H04L 5/0092; H04L 5/02; H04L 5/0044; H04J 2011/0016; H04J 13/0062; H04W 72/23

See application file for complete search history.

(56) References Cited

U.S. PATENT DOCUMENTS

| | | | |
|---|---|---|---|
| 11,349,590 B2* | 5/2022 | Bhamri | H04W 76/27 |
| 11,375,549 B2* | 6/2022 | Lei | H04W 74/0833 |
| 11,716,722 B2* | 8/2023 | Bhamri | H04W 72/0446 370/329 |
| 11,770,827 B2* | 9/2023 | Choi | H04L 1/00 370/329 |
| 2019/0044679 A1 | 2/2019 | Manolakos et al. | |
| 2022/0123896 A1* | 4/2022 | Taherzadeh Boroujeni | H04L 5/0055 |
| 2022/0225290 A1* | 7/2022 | Ganesan | H04L 5/0064 |
| 2022/0239400 A1* | 7/2022 | Bhamri | H04B 7/0452 |
| 2023/0066568 A1* | 3/2023 | Do | H04L 27/26025 |
| 2023/0117080 A1* | 4/2023 | Lei | H04L 5/0094 370/329 |
| 2023/0163915 A1* | 5/2023 | Shibaike | H04J 13/0062 370/329 |
| 2023/0319825 A1* | 10/2023 | Bhamri | H04L 5/0051 370/329 |

FOREIGN PATENT DOCUMENTS

| | | |
|---|---|---|
| WO | WO 2014/126519 A1 | 8/2014 |
| WO | WO 2017075749 A1 | 5/2017 |
| WO | WO 2019028827 A1 | 2/2019 |

OTHER PUBLICATIONS

Apple Inc.; "Discussion on CSI feedback enhancements for URLLC/ IIoT"; 3GPP Draft; R1-2008461, 3GPP TSG RAN WG1 Meeting #103-e, e-Meeting, Oct. 26-Nov. 13, 2020; 5 pages (Year: 2020).*

International Search Report and Written Opinion of the International Searching Authority directed to related International Patent Application No. PCT/CN2020/121614, dated Jul. 21, 2021; 9 pages.

NTT Docomo Inc.: 'Discussion on NR RRM measurement based on CSI-RS for L3 mobility', 3GPP Draft; R1-1708445, 3GPP TSG RAN WG1 Meeting #89, Hangzhou, P.R. China, May 2017; 9 pages.

Extended European Search Report directed to related European Application No. 20957249.4, mailed Oct. 10, 2023; 13 pages.

ETRI: "Discussion on uplink DMRS design", 3GPP Draft; R1-1710613 Discussion On Uplink DMRS Design Final, 3RD Generation Partnership Project (3GPP), Mobile Competence Centre ; 650, Route Des Lucioles ; F-06921 Sophiaantipolis Cedex ; FRANCE, vol. RAN WG1, no. Qingdao, China; Jun. 27-30, 2017June 26, 2017(Jun. 26, 2017), XP051299820, Retrieved from the Internet: URL:http://www.3gpp.org/ftp/Meetings_3GPP_SYNC/RAN1/Docs/ [retrieved on Jun. 26, 2017].

* cited by examiner

ADAPTIVE APPLICATIONS OF ORTHOGONAL COVER CODES ON RESOURCE ELEMENTS FOR WIRELESS COMMUNICATION SYSTEMS

This application is a U.S. National Phase of International Application No. PCT/CN2020/121614, filed Oct. 16, 2020, which is hereby incorporated by reference in its entirety.

BACKGROUND

Field

The described aspects generally relate to adaptive application of orthogonal cover codes in wireless communications.

Related Art

A user equipment (UE) can communicate with a base station (for example, an evolved Node B (eNB), a next generation node B (gNB), or other base station) over a communication link in a wireless communication system, e.g., New Radio (NR) system, a millimeter wave (mmWave) communication system, or other communication systems. In a communication system, a reference signal normally refers to the so-called "pilot signal" used for channel related functions, e.g., estimation, demodulation, by the receiver. Sometimes, a reference signal is a predefined signal transmitted over a set of predefined resource elements in a resource grid. Downlink reference signals are used by a UE for downlink channel measurement and/or coherent demodulation of downlink transmissions. There are various reference signals defined in downlink, e.g., cell-specific reference signal (CRS), UE-specific demodulation reference signal (DMRS), channel status information reference signal (CSI-RS), and more. However, existing reference signal designs may not be able to meet the diverse needs of various wireless communication systems, e.g., mmWave communication systems.

SUMMARY

Some aspects of this disclosure relate to apparatuses and methods for adaptive configurations of resource elements to carry reference signals for a user equipment (UE) in a multiple input multiple output (MIMO) wireless communication systems, e.g., a New Radio (NR) MIMO system, or a millimeter wave (mmWave) communication system. A configuration of resource elements to carry reference signals for a UE can be adaptively determined by a base station based on a coherence bandwidth of a channel between the UE and the base station, a coherence time of the channel, a preference associated with channel status information reference signal (CSI-RS) by the UE, or a preference associated with demodulation reference signal (DMRS) by the UE. The configuration indicates a set of resource elements, and one or more orthogonal cover codes (OCCs) applied to at least a subset of the set of resource elements to carry the CSI-RS or DMRS for one or more antenna ports of the UE.

Some aspects of this disclosure relate to a UE. The UE includes a transceiver configured to communicate with a base station through a channel between the UE and the base station, and a processor communicatively coupled to the transceiver. In some examples, the channel has one or more frequencies above 52 GHz, e.g., between 52.6 GHz and 71 GHz. The processor sends, using the transceiver and to the base station, a coherence bandwidth of the channel, a coherence time of the channel, a preference associated with CSI-RS, or a preference associated with DMRS for the UE. The processor further receives, using the transceiver and from the base station, a configuration of resource elements to carry reference signals for the UE. In detail, the processor can receive a radio resource control (RRC) signal, a medium access control (MAC) control element (CE), or a downlink control information (DCI) to indicate the configuration of resource elements to carry reference signals for the UE. The configuration is determined by the base station based on or in response to the coherence bandwidth of the channel, the coherence time of the channel, the preference associated with CSI-RS, or the preference associated with DMRS. The configuration indicates a set of resource elements, and one or more OCCs applied to at least a subset of the set of resource elements to carry the CSI-RS or DMRS for one or more antenna ports of the UE. The one or more OCCs applied to at least the subset of the set of resource elements for the one or more antenna ports can be semi-statically configured by the RRC signal, or dynamically configured by the MAC-CE or the DCI. In some examples, the processor can assign the subset of the set of resource elements or an OCC applied to the subset of the set of resource elements to an antenna port of the one or more antenna ports of the UE. The UE can have multiple antenna ports, e.g., 2, 4, 6, 8, 12, 16, or more antenna ports. Afterwards, the processor performs DMRS or CSI-RS reference signal processing based on the configuration of resource elements to carry reference signals for the UE.

In some examples, the configuration of resource elements to carry reference signals for the UE indicates a set of resource elements including at least two adjacent resource elements at two consecutive sub-carriers in a frequency domain and a symbol in a time domain. Additionally and alternatively, the set of resource elements can include at least two adjacent resource elements at two consecutive sub-carriers in the frequency domain and two adjacent symbols in the time domain. In addition, the configuration of resource elements to carry reference signals for the UE can indicate the one or more OCCs including frequency domain (FD) OCCs applied to the two adjacent resource elements at two consecutive sub-carriers in the frequency domain. Similarly, the configuration of resource elements to carry reference signals for the UE can indicate the one or more OCCs including time domain (TD) OCCs applied to the two adjacent resource elements of two adjacent symbols in the time domain. In some examples, the configuration of resource elements to carry reference signals for the UE indicates that only FD-OCCs, or TD-OCCs are applied, based on a relationship between a sub-carrier spacing (SCS) interval between the two consecutive sub-carriers at the frequency domain and the coherence bandwidth of the channel. Further in some examples, the subset of the set of resource elements having the one or more OCCs applied to is empty, and the configuration indicates no OCC is applied to the set of resource elements allocated to the one or more antenna ports of the UE.

Some aspects of this disclosure relate to a base station. The base station includes a transceiver configured to communicate over a wireless network with a UE, and a processor communicatively coupled to the transceiver. The processor receives, using the transceiver and from the UE, a coherence bandwidth of the channel, a coherence time of the channel, a preference associated with CSI-RS, or a preference associated with DMRS for the UE. The processor further determines, based on the coherence bandwidth of the channel, the coherence time of the channel, the preference associated with CSI-RS, or the preference associated with DMRS, a configuration of resource elements to carry reference signals for the UE. The configuration indicates a set of resource elements, and one or more OCCs applied to at least a subset of the set of resource elements to carry the CSI-RS or DMRS for one or more antenna ports of the UE. In some example, the processor can assign the subset of the set of resource elements or an OCC applied to the subset of the set of resource elements to an antenna port of the one or more antenna ports of the UE. In addition, the processor transmits, using the transceiver and to the UE, the configuration of resource elements to carry reference signals for the UE. In detail, the processor transmits a RRC signal, a MAC-CE, or a DCI to indicate the configuration of resource elements to carry reference signals for the UE. The one or more OCCs applied to at least the subset of the set of resource elements for the one or more antenna ports are semi-statically configured by the RRC signal, or dynamically configured by the MAC-CE or the DCI.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1:
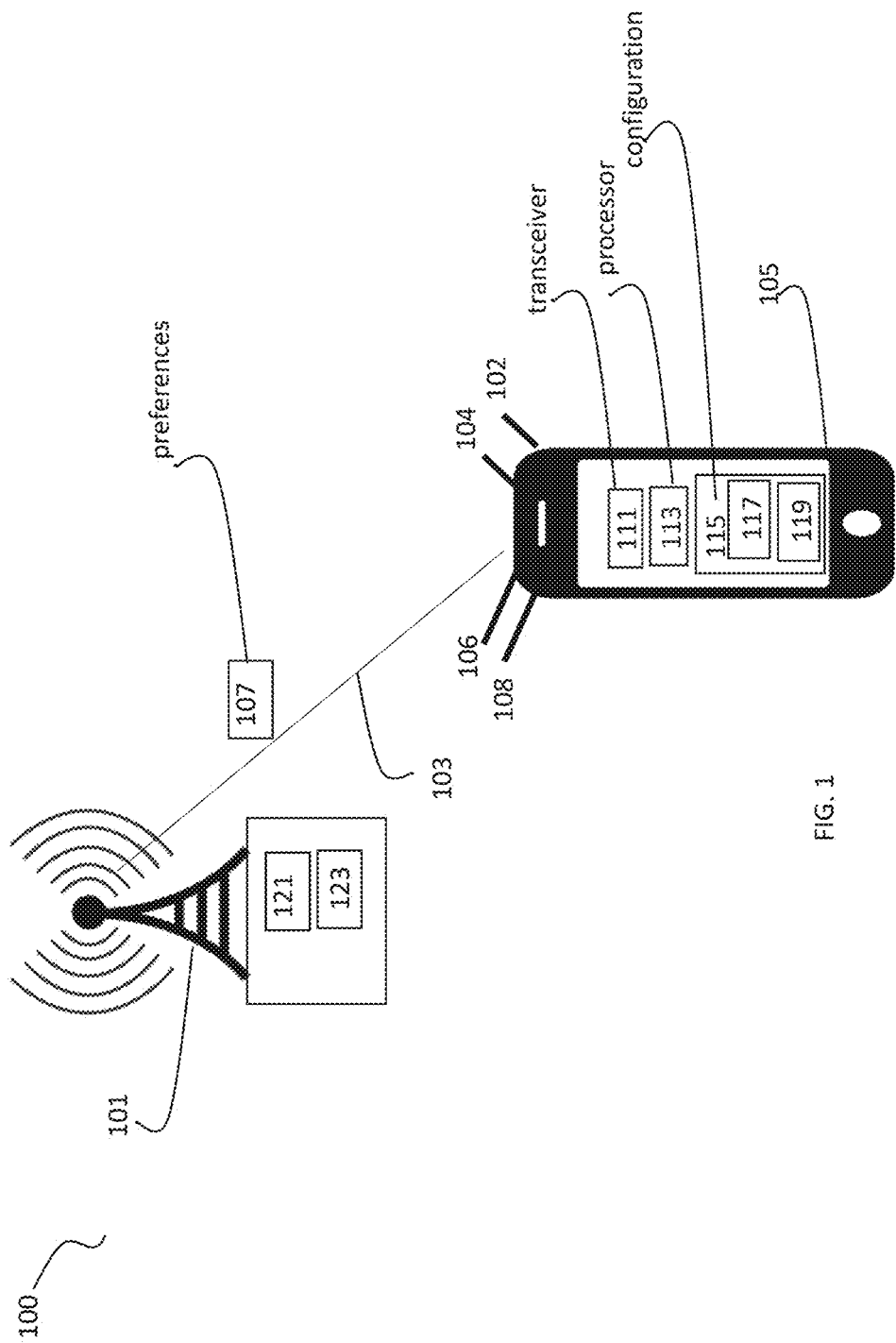
FIG. 1 illustrates an example multiple input multiple output (MIMO) wireless system implementing designs for configurations of resource elements to carry reference signals for a user equipment (UE), according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition does not in itself dictate a relationship between the various embodiments and/or configurations discussed.

It is noted that references in the specification to "one embodiment," "an embodiment," "an example embodiment," "exemplary," etc., indicate that the embodiment described may include a particular feature, structure, or characteristic, but every embodiment may not necessarily include the particular feature, structure, or characteristic. Moreover, such phases do not necessarily refer to the same embodiment. Further, when a particular feature, structure or characteristic is described in connection with an embodiment, it would be within the knowledge of one skilled in the art to effect such feature, structure or characteristic in connection with other embodiments whether or not explicitly described. In addition, words related to logical relationship, "and," "or" may mean the logic relationship. For example, "A or B" can include "A and B" or "A or B."

Wireless communication network and systems play an important role in the current society. There are many wireless communication systems, e.g., wireless systems based on 3rd Generation Partnership Project (3GPP) release 16 (Rel-16), release 17 (Rel-17), New Radio (NR) wireless systems. The next-generation wireless communication networks, e.g., NR wireless systems, provide fast data rates and greater capacity, and seamless and real-time interaction between humans and billions of intelligent devices. Millimeter wave (mmWave) communication system can operate on frequencies close to NR systems, e.g., having one or more frequencies above 52 GHz, and can bring commercial opportunities for high data rate communications, e.g., licensed or unlicensed spectrum between 57 GHz and 71 GHz.

The opportunities in mmWave communication systems also bring challenges. Operations at mmWave communication systems may demand designs different from the NR systems. For example, a mmWave communication system can have a different numerology including subcarrier spacing (SCS), and channel bandwidth. Increased SCS can be used for a mmWave communication system to ensure robustness of the system to phase noise. However, increased SCS can result in resource elements having an interval larger than the coherence bandwidth of the channel, causing failures to some communication techniques. In a communication system, a reference signal normally refers to the so-called "pilot signal" used for channel functions, e.g., estimation or demodulation, by the receiver. Orthogonal cover codes (OCCs) have been applied to resource elements to carry various reference signals, e.g., UE-specific DMRS, CSI-RS. In a mmWave communication system, due to the increased SCS, OCCs applied to resource elements can fail sometimes. New designs for OCCs applied to resource elements to carry reference signals are desired.

Some aspects of this disclosure provide improved solutions to the problems caused by increased SCS in a communication system, e.g., a mmWave communication system. Instead of using fixed OCCs applied to resource elements to carry various reference signals, a base station can determine a configuration for adaptively applying OCCs to a set of resource elements to carry reference signals. The configuration can be determined based on parameters provided by a UE. For example, a UE can provide to a base station a coherence bandwidth of the channel, a coherence time of the channel, a preference associated with CSI-RS, or a preference associated with DMRS for the UE. The base station can determine a configuration to have one or more OCCs applied to a set of resource elements semi-statically or dynamically. The configuration indicates a set of resource elements, and one or more OCCs applied to a subset of the set of resource elements to carry the CSI-RS or DMRS for one or more antenna ports of the UE. In detail, the configuration can indicate that frequency domain (FD) OCCs can be applied to at least two adjacent resource elements at two consecutive sub-carriers in the frequency domain, time domain (TD) OCCs applied to at least two adjacent resource elements of two adjacent symbols in the time domain, both FD-OCCs and TD-OCCs are applied, or none of FD-OCC and TD-OCC is applied. When both FD-OCCs and TD-OCCs are applied to the set of resource elements, the set of resource elements can carry reference signals for more antenna ports. When one or both of FD-OCC and TD-OCC are disabled from being applied to the set of resource elements, the set of resource elements can carry reference signals for fewer antenna ports. By trading off the number of antenna ports to receive reference signals, techniques provided herein can increase the reliability of the FD-OCC and TD-OCC when applied to the set of resource elements.

Although some examples of configurations for carrying reference signals, e.g., CSI-RS or DMRS, for the UE, are presented in a mmWave communication system are provided above, the aspects of this disclosure are not limited to these examples. The examples can be applicable to other wireless communication systems.

FIG. 1 illustrates an example MIMO wireless system 100 implementing designs for configurations of resource elements to carry reference signals for a UE 105, according to some aspects of the disclosure. The wireless system 100 is provided for the purpose of illustration only and does not limit the disclosed aspects. The system 100 can include, but is not limited to, a network node (herein referred to as base station) 101 and an electronic device (hereinafter referred to as UE) 105.

According to some aspects, the base station 101 can include a node configured to operate based on a wide variety of wireless communication techniques such as, but not limited to, techniques for a mmWave communication system with one or more frequencies above 52 GHz, or techniques based on 3GPP standards. For example, base station 101 can include a node configured to operate using Rel-16, Rel-17, or other present/future 3GPP standards. The base station 101 can be a fixed station, and may also be called a base transceiver system (BTS), an access point (AP), a transmission/reception point (TRP), an evolved NodeB (eNB), a next generation node B (gNB), or some other equivalent terminology.

According to some aspects, the UE 105 can include an electronic device configured to operate based on a wide variety of wireless communication techniques, e.g., techniques for a mmWave communication system with one or more frequencies above 52 GHz. These techniques can also include, but are not limited to, techniques based on 3rd Generation Partnership Project (3GPP) standards. For example, the UE 105 can include an electronic device configured to operate using Rel-16, Rel-17 or other present/future 3GPP standards. The UE 105 can include, but is not limited to, a wireless communication device, a smart phone, a laptop, a desktop, a tablet, a personal assistant, a monitor, a television, a wearable device, an Internet of Things (IoTs), a vehicle's communication device, a mobile station, a subscriber station, a remote terminal, a wireless terminal, a user device, or the like.

In some examples, the UE 105 can include a transceiver 111 configured to wirelessly communicate with the base station 101 through a channel 103 between the UE 105 and the base station 101. The UE 105 further includes a processor 113 communicatively coupled to the transceiver 111. Similarly, the base station 101 can include a transceiver 121 configured to wirelessly communicate with the UE 105 through the channel 103, and a processor 123 communicatively coupled to the transceiver 121. More detailed operations of the transceiver 111, the processor 113, the transceiver 121, and the processor 123 are shown in more details in FIGS. 6 and 7. In some examples, the channel 103 can have one or more frequencies above 52 GHz, e.g., between 52.6 GHz and 71 GHz. The UE 105 can include multiple antenna ports, e.g., an antenna port 102, an antenna port 104, an antenna port 106, an antenna port 108. The number of antenna ports is shown for example only, and is not limiting. For example, the UE 105 can include 2, 4, 6, 8, 12, 16, or more antenna ports.

The base station 101 can send various downlink reference signals to the UE 105 for downlink channel measurement and/or coherent demodulation of downlink transmission. There are various reference signals defined in downlink, e.g., cell-specific reference signal (CRS), UE-specific DMRS, CSI-RS, and more. A DMRS or CSI-RS reference signal can be processed by the UE 105 according to a configuration 115 stored in the UE 105. In the current disclosure, a DMRS or CSI-RS signal is used as an example to describe techniques presented herein. Accordingly, these techniques can be applicable to other reference signals with little or no change. Similar techniques can be applied to uplink reference signals as well.

In some examples, the configuration 115 can be determined by the base station 101, and further received from the base station 101 by the UE 105. The configuration 115 can be adaptively determined by the base station 101 based on information or parameters provided by the UE 105. In some detail, the UE 105 can send to the base station 101 an uplink information 107, where the uplink information 107 can include a coherence bandwidth of the channel, a coherence time of the channel, a preference associated with CSI-RS, or a preference associated with DMRS for the UE 105. The base station 101 can receive the uplink information 107, and further determine a configuration based on the coherence bandwidth of the channel, the coherence time of the channel, the preference associated with CSI-RS, e.g., carried in sounding reference signal (SRS), or the preference associated with DMRS. Afterwards, the base station 101 can send to the UE 105 the determined configuration. The UE 105 can receive the configuration from the base station 101, which can be saved by the UE 105 to become the configuration 115.

In some examples, the configuration 115 can indicate a set of resource elements 117, and one or more OCCs 119 applied to at least a subset of the set of resource elements to carry reference signals, e.g., CSI-RS or DMRS, for one or more antenna ports, e.g., the antenna port 102, the antenna port 104, of the UE 105.

Figure 4A:
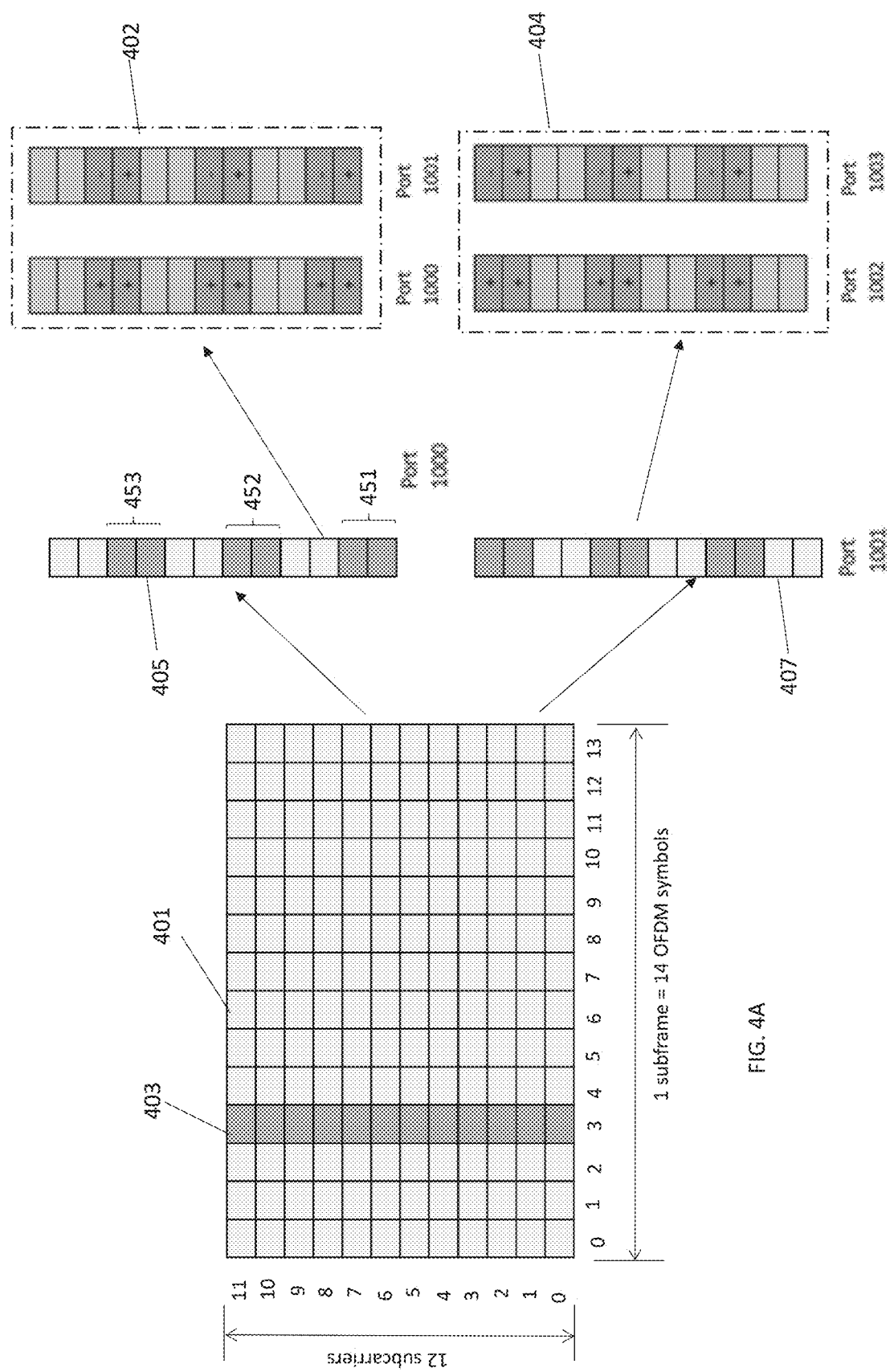
FIGS. 4A-4B illustrate example configurations of resource elements to carry reference signals for a UE, according to some aspects of the disclosure.
Figure 4B:
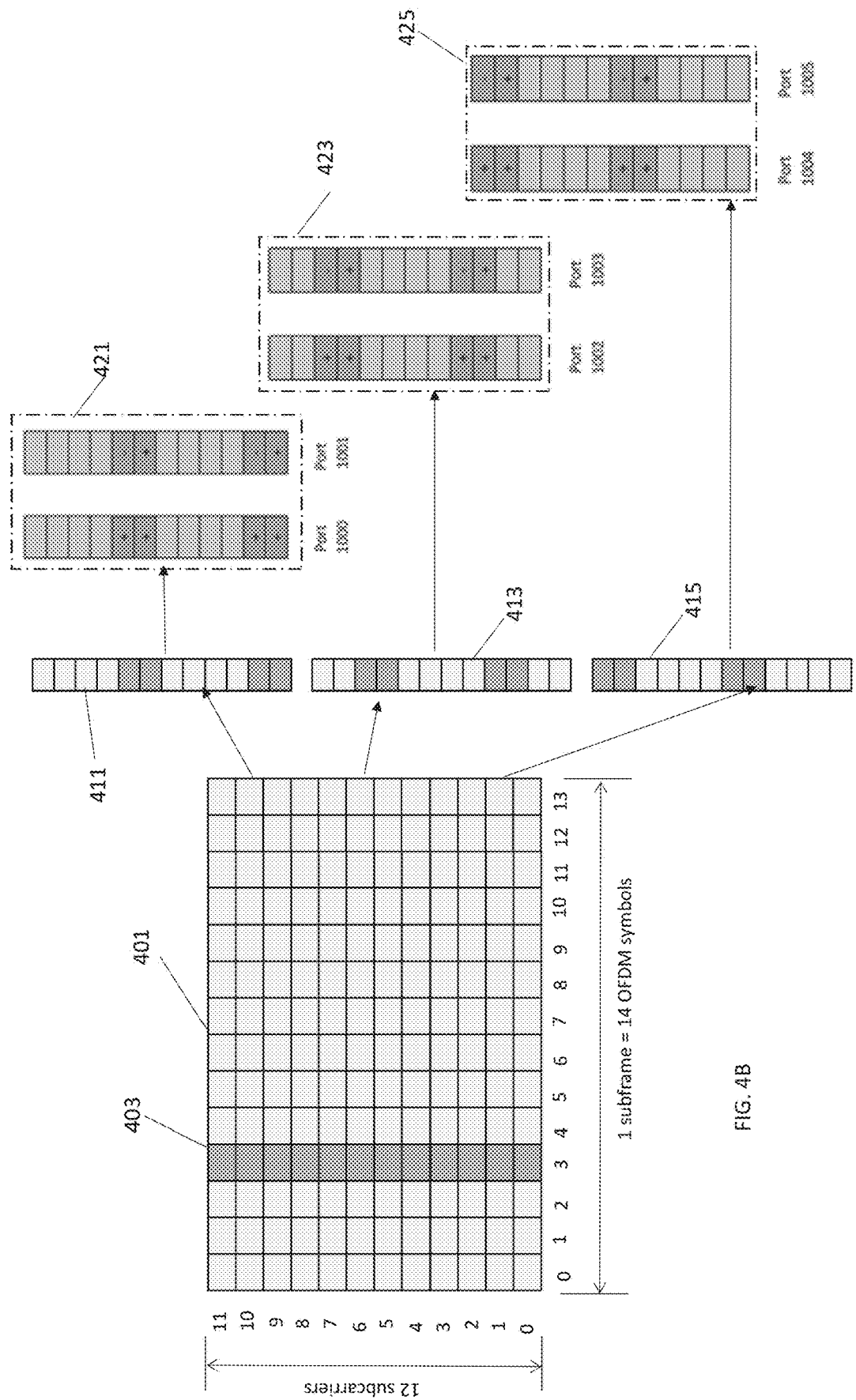
Figure 5A:
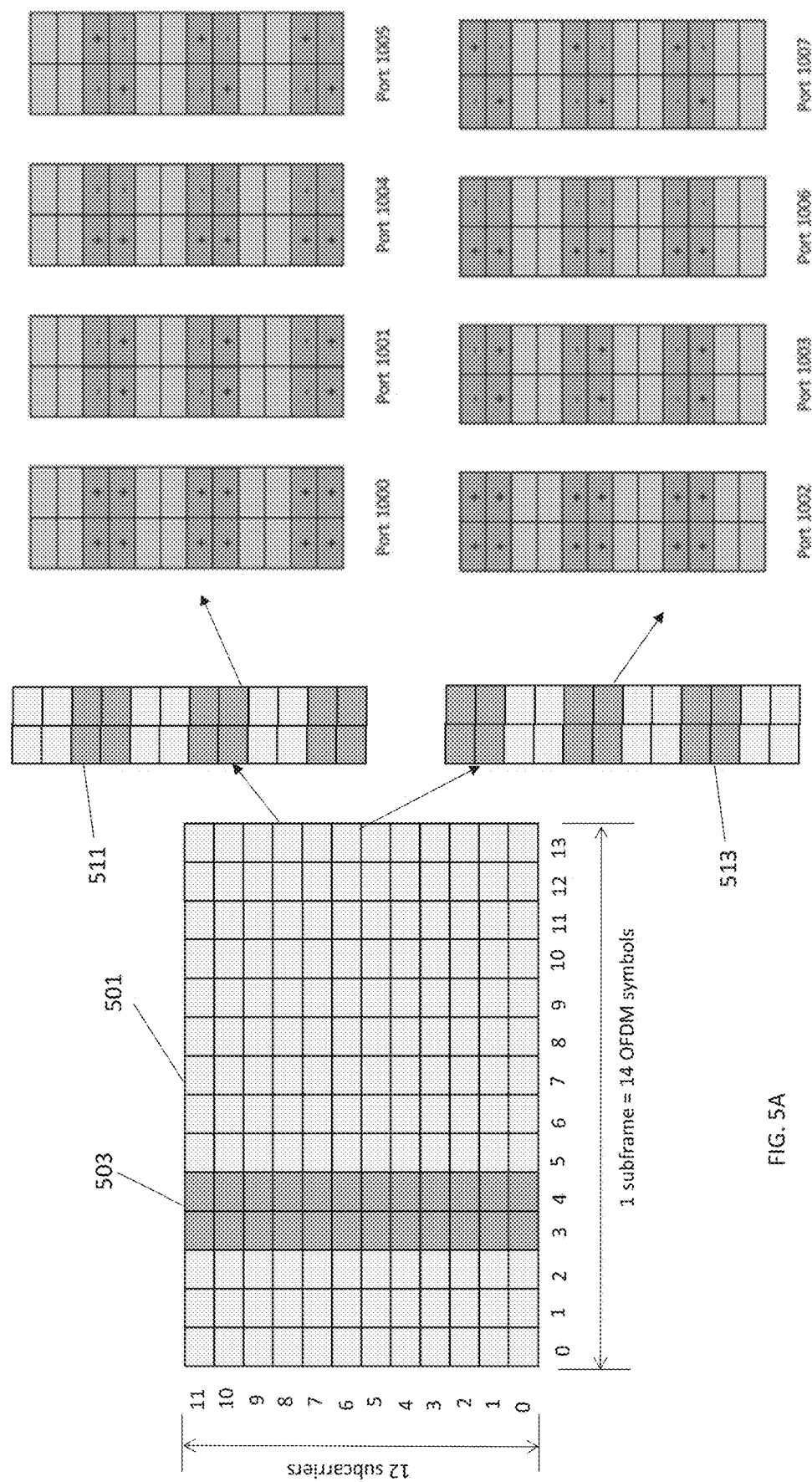
FIGS. 5A-5C illustrate example configurations of resource elements to carry reference signals for a UE, according to some aspects of the disclosure.
Figure 5B:
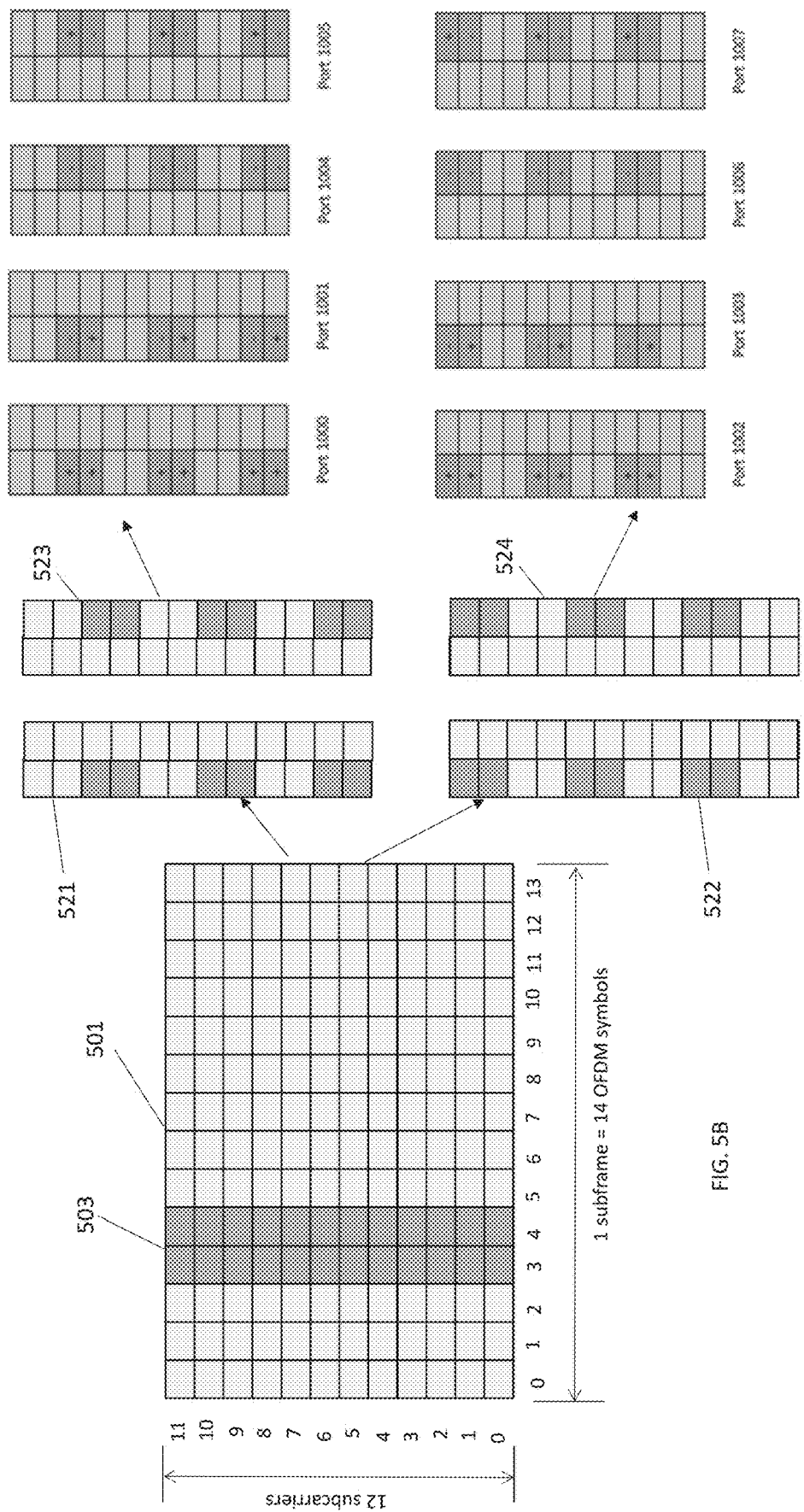
Figure 5C:
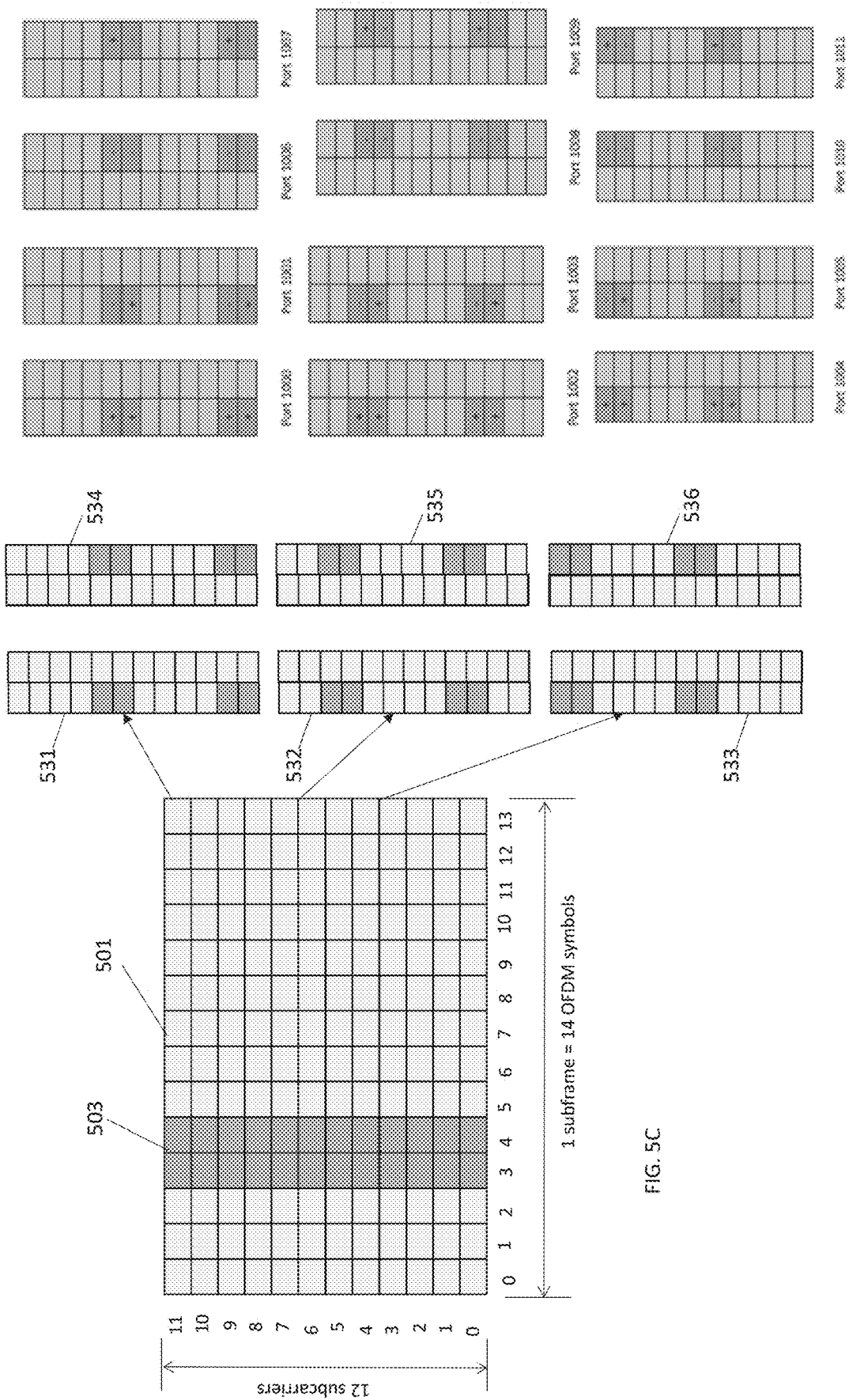

In some examples, the set of resource elements 117 includes at least two adjacent resource elements (REs) at two consecutive sub-carriers in a frequency domain and a symbol in a time domain. In other words, the set of resource elements 117 includes at least multiple adjacent REs formed of one symbol. More details of such resource elements are shown in FIGS. 4A-4B. In some other examples, the set of resource elements 117 includes at least two adjacent REs at two consecutive sub-carriers in the frequency domain and two adjacent symbols in the time domain. In other words, the set of resource elements 117 includes at least multiple adjacent REs formed of two symbols. More details of such resource elements are shown in FIGS. 5A-5C.

In some examples, the one or more OCCs 119 include frequency domain (FD) OCCs applied to the two adjacent resource elements at two consecutive sub-carriers in the frequency domain, or time domain (TD) OCCs applied to the at least two adjacent resource elements of two adjacent symbols in the time domain. In some examples, the configuration 115 indicates that only FD-OCCs, or only TD-OCCs are applied, based on a relationship between a sub-carrier spacing (SCS) interval between the two consecutive sub-carriers at the frequency domain and the coherence bandwidth of the channel. In some examples, there may be no OCCs applied to the set of REs 117, and the one or more OCCs 119 will not be available. More details of the applications of OCCs are shown in FIGS. 4A-4B and FIGS. 5A-5C. Furthermore in some examples, the number of resource elements can be adjusted to keep within the coherence bandwidth, even if the resources elements can have an interval between them.

In some examples, the processor 113 and the processor 123 can be configured to perform methods supporting designs for configurations of carrying reference signals for a UE, e.g., the configuration 115. More details of the operations of the processor 113 and the processor 123 are shown in FIG. 2 and FIG. 3 below.

Figure 2:
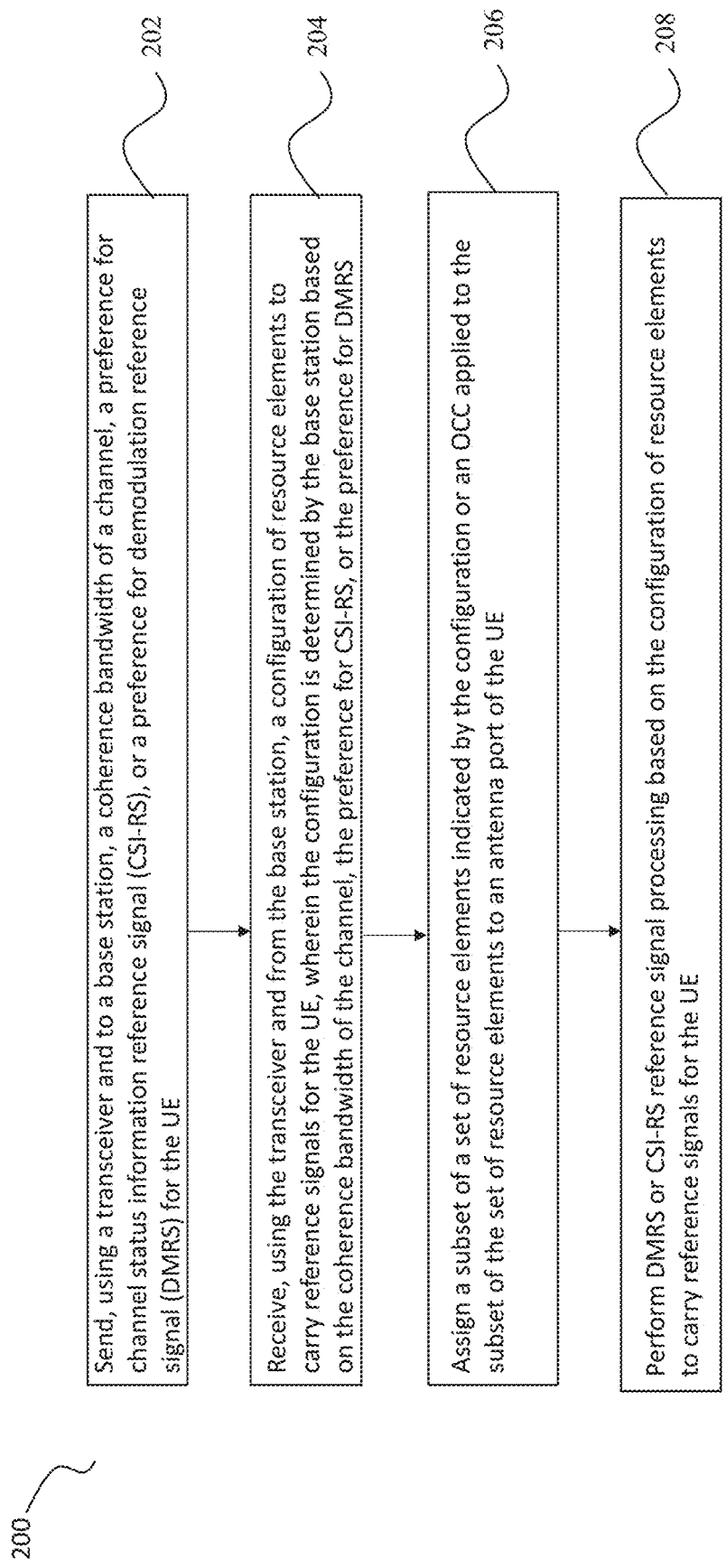
FIG. 2 illustrates an example method for a system (for example a user equipment (UE)) supporting mechanisms for implementing designs for configurations of resource elements to carry reference signals for a UE, according to some aspects of the disclosure.
Figure 3:
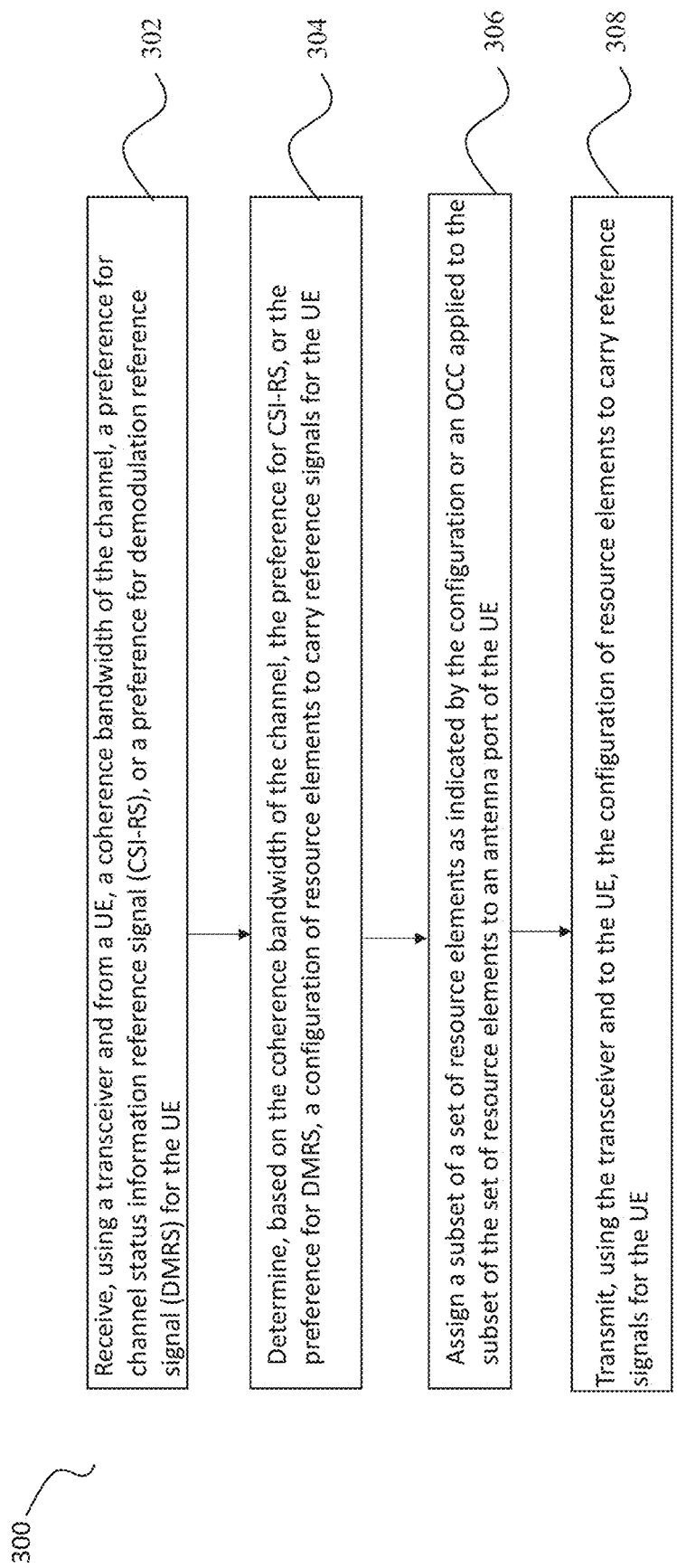
FIG. 3 illustrates an example method for a system (for example a base station) supporting mechanisms for implementing designs for configurations of resource elements to carry reference signals for a UE, according to some aspects of the disclosure.

FIG. 2 illustrates an example method 200 for the UE 105 supporting mechanisms for implementing designs for configurations of resource elements to carry reference signals for a UE. Method 200 can be performed by the UE 105, which can be implemented by the system 600 of FIG. 6 and/or computer system 700 of FIG. 7. But method 200 is not limited to the specific aspects depicted in those figures and other systems may be used to perform the method as will be understood by those skilled in the art. It is to be appreciated that not all operations may be needed, and the operations may not be performed in the same order as shown in FIG. 2.

At 202, using a transceiver, a UE sends, to a base station, a coherence bandwidth of the channel, a coherence time of the channel, a preference associated with CSI-RS, or a preference associated with DMRS for the UE. For example, using the transceiver 101, the UE 105 sends, to the base station 101, the uplink information 107 that includes a coherence bandwidth of the channel, the coherence time of the channel, a preference associated with CSI-RS, or a preference associated with DMRS for the UE 105, as described for FIG. 1.

At 204, using the transceiver, the UE receives, from the base station, a configuration of resource elements to carry reference signals for the UE, where the configuration is determined by the base station based on the coherence bandwidth of the channel, the coherence time of the channel, the preference associated with CSI-RS, or the preference associated with DMRS. For example, the UE 105 receives, from the base station 101, the configuration 115 for CSI-RS or DMRS for the UE, as described for FIG. 1. The configuration 115 can be used for other reference signals as well.

In detail, the processor 113 of the UE 105 receives a RRC signal, a MAC-CE, or a DCI to indicate the configuration 115 for CSI-RS or DMRS for the UE 105. The configuration 115 includes the set of resource elements 117, and one or more OCCs 119 applied to at least a subset of the set of resource elements to carry the CSI-RS or DMRS for one or more antenna ports of the UE 105. In some examples, the one or more OCCs 119 applied to at least the subset of the set of resource elements for the one or more antenna ports can be semi-statically configured by the RRC signal, or dynamically configured by the MAC-CE or the DCI.

At 206, the UE assigns the subset of the set of resource elements or an OCC applied to the subset of the set of resource elements to an antenna port of the UE. For example, the UE 105 assigns the subset of the set of resource elements or an OCC applied to the subset of the set of resource elements to an antenna port of the UE, as described for FIG. 1. Operations at 206 can be optional. In some examples, the assignments of the resource elements or the OCCs to an antenna port can be based on a standard, or assigned by the base station instead of the UE. More detailed examples of such assignments are shown in FIGS. 4A-4B and FIGS. 5A-5C.

At 208, the UE performs DMRS or CSI-RS reference signal processing based on the configuration of resource elements to carry reference signals for the UE. For example, the UE 105 performs DMRS or CSI-RS reference signal processing based on the configuration 115 for CSI-RS or DMRS for the UE, as described for FIG. 1.

FIG. 3 illustrates an example method 300 for the base station 101 supporting mechanisms for implementing designs for configurations of resource elements to carry reference signals for a UE. Method 300 may also be performed by system 600 of FIG. 6 and/or computer system 700 of FIG. 7. But method 300 is not limited to the specific aspects depicted in those figures and other systems may be used to perform the method as will be understood by those skilled in the art. It is to be appreciated that not all operations may be needed, and the operations may not be performed in the same order as shown in FIG. 3.

At 302, a base station receives, using a transceiver and from the UE, a coherence bandwidth of the channel, a coherence time of the channel, a preference associated with CSI-RS, or a preference associated with DMRS for the UE. For example, the base station 101 receives, using the transceiver 121 and from the UE 105, the uplink information 107 that includes a coherence bandwidth of the channel, the coherence time of the channel, a preference associated with CSI-RS, or a preference associated with DMRS for the UE, as described for FIG. 1.

At 304, the base station determines, based on the coherence bandwidth of the channel, the coherence time of the channel, the preference associated with CSI-RS, or the preference associated with DMRS, a configuration of resource elements to carry reference signals for the UE. For example, the base station 101 determines, based on the coherence bandwidth of the channel, the coherence time of the channel, the preference associated with CSI-RS, or the preference associated with DMRS contained in the uplink information 107, a configuration of resource elements to carry reference signals for the UE 105. The configuration includes a set of resource elements, and one or more OCCs applied to at least a subset of the set of resource elements to carry the CSI-RS or DMRS for one or more antenna ports of the UE 105.

At 306, the base station assigns the subset of the set of resource elements or an OCC applied to the subset of the set of resource elements to an antenna port of the UE. For example, the base station 101 assigns the subset of the set of resource elements or an OCC applied to the subset of the set of resource elements to an antenna port of the UE, as described for FIG. 1. Operations at 306 can be optional. In some examples, the assignments of the resource elements or the OCCs to an antenna port can be based on a standard, or assigned by the UE instead of the base station 101. More detailed examples of such assignments are shown in FIGS. 4A-4B and FIGS. 5A-5C.

At 308, the base station transmits, using the transceiver and to the UE, the configuration of resource elements to carry reference signals for the UE. For example, the base station 101 transmits, using the transceiver 121 and to the UE 105, the configuration of resource elements to carry reference signals for the UE 105, which is saved by the UE 105 as the configuration 115, as described for FIG. 1. In detail, the processor 123 of the base station 101 can transmit a RRC signal, a MAC-CE, or a DCI to indicate the configuration 115 for CSI-RS or DMRS for the UE 105. The configuration 115 includes the set of resource elements 117, and one or more OCCs 119 applied to at least a subset of the set of resource elements to carry the CSI-RS or DMRS for one or more antenna ports of the UE 105. In some examples, the one or more OCCs 119 applied to at least the subset of the set of resource elements for the one or more antenna ports are semi-statically configured by the RRC signal, or dynamically configured by the MAC-CE or the DCI.

FIGS. 4A-4B illustrate example configurations of resource elements to carry reference signals for a UE, according to some aspects of the disclosure. The configurations can be an example of the configure 115 shown in FIG. 1. The configurations in FIGS. 4A-4B indicate a set of resource elements 403, and one or more OCCs applied to at least a subset of the set of resource elements 403 to carry the CSI-RS or DMRS for one or more antenna ports of the UE.

In some examples, as shown in FIG. 4A, the set of resource elements 403 is a resource block (RB) of 12 resource elements (REs), where each resource element (RE) includes one orthogonal frequency division multiplexing (OFDM) symbol on one subcarrier. The set of resource elements 403 is shown in an exemplary OFDM time-frequency grid 401 in the time domain and the frequency domain. In the frequency domain, the physical resources are divided into adjacent subcarriers with a subcarrier spacing (SCS). In some example, the SCS can be 15 kHz. In a mmWave system, the SCS can be larger than 15 kHz. The number of subcarriers varies according to the allocated system bandwidth. The OFDM time-frequency grid 401 includes 12 subcarriers over 14 symbols. The 14 symbols can form a subframe of one millisecond. In some examples, a subframe can have 12 symbols if an extended cyclic prefix is used.

In some examples, the set of resource elements 403 is divided into multiple subsets of resource elements to carry the CSI-RS or DMRS for one or more antenna ports of the UE. For example, as shown in FIG. 4A, the resource elements 403 is divided into two disjoint subsets, a subset 405 of REs, and a subset 407 of REs. The subset 405 of REs includes multiple pairs of REs, e.g., a pair of REs 451, a pair of REs 452, and a pair of REs 453. The pair of REs 451, the pair of REs 452, or the pair of REs 453 includes two adjacent resource elements at two consecutive sub-carriers in the frequency domain and a symbol in the time domain. For example, the pair of REs 451 includes two adjacent resource elements at two consecutive sub-carriers 0 and 1, and the symbol 3 in the time domain, since the pair of REs 451 is part of the set of resource elements 403. The subset 407 of REs has similar structures as the subset 405 of REs.

Without the use of OCCs, the subset 405 of REs can be assigned to an antenna port, e.g., port 1000, while the subset 407 of REs can be assigned to another antenna port, e.g., port 1001. However, the subset 405 of REs can only be assigned to one antenna port without the use of OCCs. Therefore, the set of resource elements 403 is split into two subsets of REs to carry the CSI-RS or DMRS for two antenna ports of the UE.

In some examples, an OCC can be used to maintain orthogonality between antenna ports allocated to the same REs. As shown in FIG. 4A, two OCCs, {1 1} and {1 -1} can be applied to the subset 405 of REs in the frequency domain so that the same subset 405 of REs can carry reference signals for two antenna ports of the UE. The OCC {1 1} is represented by "+" "+" marked on two resource elements at two consecutive sub-carriers in the frequency domain, while the OCC {1 -1} is represented by "+" "-" marked on two resource elements at two consecutive sub-carriers in the frequency domain. Accordingly, the subset 405 of REs with the OCC {1 1} applied to the REs can be assigned to an antenna port, e.g., antenna port 1000, and the subset 405 of REs with the OCC {1 -1} applied to the REs can be assigned to an antenna port, e.g., antenna port 1001. The subset 405 of REs with two OCCs applied in the frequency domain form a code division multiplexing (CDM) group 402.

Similarly, two OCCs, {1 1} and {1 -1} can be applied to the subset 407 of REs in the frequency domain so that the same subset 407 of REs can carry reference signals for two antenna ports of the UE. Accordingly, the subset 407 of REs with the OCC {1 1} applied to the REs can be assigned to an antenna port, e.g., antenna port 1002, and the subset 405 of REs with the OCC {1 -1} applied to the REs can be assigned to an antenna port, e.g., antenna port 1003. The assignments of a subset of REs together with an OCC to an antenna port can be performed dynamically by a UE or a base station, or by a standard known ahead of time.

In some examples, as shown in FIG. 4B, the set of resource elements 403 is divided into three subsets of resource elements, a subset 411 of REs, a subset 413 of REs, and a subset 415 of REs, to carry the CSI-RS or DMRS for one or more antenna ports of the UE. The subset 411 of REs, the subset 413 of REs, the subset 415 of REs, includes multiple pairs of resource elements, where a pair of REs includes two adjacent resource elements at two consecutive sub-carriers in the frequency domain and a symbol in the time domain.

Without the use of OCCs, the subset 411 of REs can be assigned to a first antenna port, e.g., port 1000, the subset 413 of REs can be assigned to a second antenna port, e.g., port 1001, while the subset 415 of REs can be assigned to a third antenna port, e.g., port 1002. However, each subset of REs can only be assigned to one antenna port without the use of OCCs.

In some examples, an OCC can be used to maintain orthogonality between antenna ports allocated to the same DMRS REs. Two OCCs, {1 1} and {1 -1} can be applied to the subset 411 of REs in the frequency domain so that the same subset 411 of REs can carry reference signals for two antenna ports of the UE. Accordingly, the subset 411 of REs with the OCC {1 1} applied to the REs can be assigned to an antenna port, e.g., antenna port 1000, and the subset 411 of REs with the OCC {1 −1} applied to the REs can be assigned to an antenna port, e.g., antenna port 1001. The subset 411 of REs with two OCCs applied in the frequency domain form a code division multiplexing (CDM) group 421.

Similarly, two OCCs, {1 1} and {1 −1} can be applied to the subset 413 of REs in the frequency domain so that the same subset 413 of REs can carry reference signals for two antenna ports of the UE. Accordingly, the subset 413 of REs with the OCC {1 1} applied to the REs can be assigned to an antenna port, e.g., antenna port 1002, and the subset 413 of REs with the OCC {1 −1} applied to the REs can be assigned to an antenna port, e.g., antenna port 1003. The subset 413 of REs with two OCCs applied in the frequency domain form a code division multiplexing (CDM) group 423.

Similarly, two OCCs, {1 1} and {1 −1} can be applied to the subset 415 of REs in the frequency domain so that the same subset 415 of REs can carry reference signals for two antenna ports of the UE. Accordingly, the subset 415 of REs with the OCC {1 1} applied to the REs can be assigned to an antenna port, e.g., antenna port 1004, and the subset 415 of REs with the OCC {1 −1} applied to the REs can be assigned to an antenna port, e.g., antenna port 1005. The subset 415 of REs with two OCCs applied in the frequency domain form a code division multiplexing (CDM) group 425.

FIGS. 5A-5C illustrate example configurations of resource elements to carry reference signals for a UE, according to some aspects of the disclosure. The configurations can be an example of the configure 115 shown in FIG. 1. The configurations in FIGS. 5A-5C indicate a set of resource elements 503, and one or more OCCs applied to at least a subset of the set of resource elements to carry the CSI-RS or DMRS for one or more antenna ports of the UE.

In some examples, as shown in FIG. 5A, the set of resource elements 503 is a resource block (RB) of 24 REs over two symbols, symbol 3 and symbol 4. The set of resource elements 503 is shown in an exemplary OFDM time-frequency grid 501 in the time domain and the frequency domain. The OFDM time-frequency grid 501 includes 12 subcarriers over 14 symbols. The 14 symbols can form a subframe of one millisecond. In some examples, a subframe can have 12 symbols if an extended cyclic prefix is used.

In some examples, the set of resource elements 503 is divided into multiple subsets of resource elements to carry the CSI-RS or DMRS for one or more antenna ports of the UE. For example, as shown in FIG. 5A, the resource elements 503 is divided into two disjoint subsets, a subset 511 of REs, and a subset 513 of REs. The subset 511 of REs or the subset 513 of REs includes multiple pairs of REs. A pair of REs includes two adjacent resource elements at two consecutive sub-carriers in the frequency domain and two adjacent symbols in the time domain.

Without the use of OCCs, the subset 511 of REs can be assigned to an antenna port, e.g., port 1000, while the subset 513 of REs can be assigned to another antenna port, e.g., port 1001. However, the subset 511 of REs can only be assigned to one antenna port without the use of OCCs. Therefore, the set of resource elements 503 is split into two subsets of REs to carry the CSI-RS or DMRS for two antenna ports of the UE.

In some examples, an OCC can be used to maintain orthogonality between antenna ports allocated to the same DMRS REs. Two OCCs, {1 1} and {1 −1} can be applied to the subset 511 of REs in the frequency domain. In addition, two OCCs, {1 1} and {−1 −1} can be applied to the subset 511 of REs in the time domain. Overall, the subset 511 of REs with the corresponding FD-OCCs and TD-OCCs can be assigned to four antenna ports, e.g., antenna port 1000, antenna port 1001, antenna port 1004, and antenna port 1005.

Similarly, two OCCs, {1 1} and {1 −1} can be applied to the subset 513 of REs in the frequency domain. In addition, two OCCs, {1 1} and {−1 −1} can be applied to the subset 513 of REs in the time domain. Overall, the subset 513 of REs with the corresponding FD-OCCs and TD-OCCs can be assigned to four antenna ports, e.g., antenna port 1002, antenna port 1003, antenna port 1006, and antenna port 1007.

In some examples, as shown in FIG. 5B, the set of resource elements 503 is divided into four disjoint subsets, a subset 521 of REs, a subset 522 of REs, a subset 523 of REs, a subset 524 of REs, each of which includes multiple pairs REs. A pair of REs includes two adjacent resource elements at two consecutive sub-carriers in the frequency domain and one symbol in the time domain.

Without the use of OCCs, the subset 521 of REs can be assigned to an antenna port, e.g., port 1000. Similarly, each of the subset 522 of REs, the subset 523 of REs, and the subset 524 of REs can be assigned to an antenna port, e.g., port 1001, port 1002, port 1003. Therefore, the set of resource elements 503 is split into four subsets of REs to carry the CSI-RS or DMRS for four antenna ports of the UE.

In some examples, an OCC can be used to maintain orthogonality between antenna ports allocated to the same DMRS REs. Two OCCs, {1 1} and {1 −1} can be applied to the subset 521 of REs in the frequency domain. Hence, the subset 521 of REs with the corresponding FD-OCCs can be assigned to two antenna ports, e.g., antenna port 1000, antenna port 1001. Similarly, the subset 523 of REs with the corresponding FD-OCCs can be assigned to two antenna ports, e.g., antenna port 1004, antenna port 1005; the subset 522 of REs with the two corresponding FD-OCCs can be assigned to two antenna ports, e.g., antenna port 1002, antenna port 1003; and the subset 524 of REs with the two corresponding FD-OCCs can be assigned to two antenna ports, e.g., antenna port 1006, antenna port 1007. As shown above, only FD-OCCs are applied to a subset of REs, without applying any TD-OCCs. A base station can make such a determination to apply only FD-OCCs based on a relationship between a SCS interval at the frequency domain and the coherence bandwidth of the channel. When the coherence bandwidth of the channel is small compared to the SCS interval, TD-OCCs may not be applied to the subset of REs. Similarly, the base station can make a determination to apply only TD-OCCs without FD-OCCs to some other subsets of REs, not shown.

In some examples, as shown in FIG. 5C, the set of resource elements 503 is divided into six disjoint subsets, a subset 531 of REs, a subset 532 of REs, a subset 533 of REs, a subset 534 of REs, a subset 535 of REs, and a subset 536 of REs, each of which includes multiple pairs REs. A pair of REs includes two adjacent resource elements at two consecutive sub-carriers in the frequency domain and one symbol in the time domain.

Without the use of OCCs, the subset 531 of REs can be assigned to an antenna port, e.g., port 1000. Similarly, each of the subset 532 of REs, the subset 533 of REs, the subset 534 of REs, the subset 535 of REs, and the subset 536 of REs, can be assigned to an antenna port, e.g., port 1001, port 1002, port 1003, port 1004, port 1005. Therefore, the set of resource elements 503 is split into 6 subsets of REs to carry the CSI-RS or DMRS for 6 antenna ports of the UE.

In some examples, an OCC can be used to maintain orthogonality between antenna ports allocated to the same DMRS REs. Two OCCs, {1 1} and {1 −1} can be applied to the subset 531 of REs in the frequency domain. Hence, the subset 531 of REs with the corresponding FD-OCCs can be assigned to two antenna ports, e.g., antenna port 1000, antenna port 1001. Similarly, the subset 532 of REs with the corresponding FD-OCCs can be assigned to two antenna ports, e.g., antenna port 1002, antenna port 1003; the subset 533 of REs with the corresponding FD-OCCs can be assigned to two antenna ports, e.g., antenna port 1004, antenna port 1005; the subset 534 of REs with the corresponding FD-OCCs can be assigned to two antenna ports, e.g., antenna port 1006, antenna port 1007; the subset 535 of REs with the corresponding FD-OCCs can be assigned to two antenna ports, e.g., antenna port 1008, antenna port 1009; the subset 536 of REs with the corresponding FD-OCCs can be assigned to two antenna ports, e.g., antenna port 1010, antenna port 1011.

The various configurations of resource elements to carry reference signals for a UE, with or without FD-OCCs or TD-OCCs, as shown in FIGS. 4A-4B and FIGS. 5A-5C, are for examples only, and are not limiting. For example, the set of resource elements 403 or the set of resource elements 503 can be split into multiple subsets of REs in different ways. In addition, different OCCs, e.g., other length-2 OCCs, or length-4 OCCs can be assigned to a subset of REs, resulting to assignments to a number of antenna ports different from what are shown in FIGS. 4A-4B and FIGS. 5A-5C.

Figure 6:
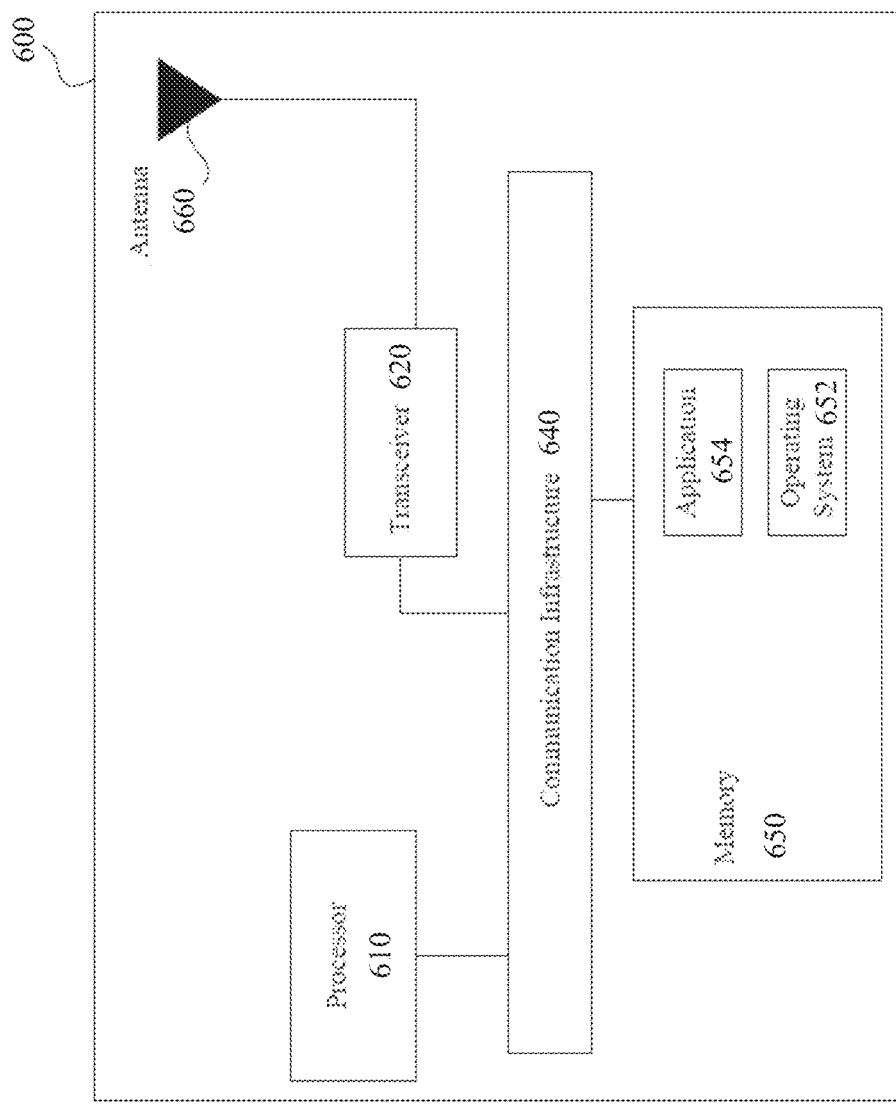
FIG. 6 illustrates a block diagram of an example system of an electronic device implementing designs for configurations of resource elements to carry reference signals for a UE, according to some aspects of the disclosure.

FIG. 6 illustrates a block diagram of an example system 600 of an electronic device implementing designs for configurations of resource elements to carry reference signals for a UE, according to some aspects of the disclosure. System 600 may be any of the electronic devices (e.g., the base station 101, the UE 105) of system 100. The system 600 includes a processor 610, one or more transceivers 620, communication infrastructure 640, memory 650, operating system 652, application 654, and one or more antenna 660. Illustrated systems are provided as exemplary parts of system 600, and system 600 can include other circuit(s) and subsystem(s). Also, although the systems of system 600 are illustrated as separate components, the aspects of this disclosure can include any combination of these, less, or more components.

Memory 650 may include random access memory (RAM) and/or cache, and may include control logic (e.g., computer software) and/or data. Memory 650 may include other storage devices or memory such as, but not limited to, a hard disk drive and/or a removable storage device/unit. According to some examples, operating system 652 can be stored in memory 650. Operating system 652 can manage transfer of data from memory 650 and/or one or more applications 654 to processor 610 and/or one or more transceivers 620. In some examples, operating system 652 maintains one or more network protocol stacks (e.g., Internet protocol stack, cellular protocol stack, and the like) that can include a number of logical layers. At corresponding layers of the protocol stack, operating system 652 includes control mechanism and data structures to perform the functions associated with that layer.

According to some examples, application 654 can be stored in memory 650. Application 654 can include applications (e.g., user applications) used by wireless system 600 and/or a user of wireless system 600. The applications in application 654 can include applications such as, but not limited to, Siri™, FaceTime™, radio streaming, video streaming, remote control, and/or other user applications.

System 600 can also include communication infrastructure 640. Communication infrastructure 640 provides communication between, for example, processor 610, one or more transceivers 620, and memory 650. In some implementations, communication infrastructure 640 may be a bus. Processor 610 together with instructions stored in memory 650 performs operations enabling system 600 to implement mechanisms for configurations of resource elements to carry reference signals for a UE, as described herein for the system 100 as shown in FIG. 1.

One or more transceivers 620 transmit and receive communications signals that support mechanisms for configurations of resource elements to carry reference signals for a UE as shown in FIG. 1. Additionally, one or more transceivers 620 transmit and receive communications signals that support mechanisms for transmitting the configurations of resource elements to carry reference signals for a UE as shown in FIG. 1. According to some aspects, one or more transceivers 620 may be coupled to antenna 660. Antenna 660 may include one or more antennas that may be the same or different types. One or more transceivers 620 allow system 600 to communicate with other devices that may be wired and/or wireless. In some examples, one or more transceivers 620 can include processors, controllers, radios, sockets, plugs, buffers, and like circuits/devices used for connecting to and communication on networks. According to some examples, one or more transceivers 620 include one or more circuits to connect to and communicate on wired and/or wireless networks.

According to some aspects of this disclosure, one or more transceivers 620 can include a cellular subsystem, a WLAN subsystem, and/or a Bluetooth™ subsystem, each including its own radio transceiver and protocol(s) as will be understood by those skilled arts based on the discussion provided herein. In some implementations, one or more transceivers 620 can include more or fewer systems for communicating with other devices.

In some examples, one or more transceivers 620 can include one or more circuits (including a WLAN transceiver) to enable connection(s) and communication over WLAN networks such as, but not limited to, networks based on standards described in IEEE 802.11.

Additionally, or alternatively, one or more transceivers 620 can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, one or more transceivers transceiver 620 can include a Bluetooth™ transceiver.

Additionally, one or more transceivers 620 can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), mmWave systems, and the like. For example, one or more transceivers 220 can be configured to operate according to one or more of Rel-15, Rel-16, Rel-17, or other present/future 3GPP standards.

According to some aspects of this disclosure, processor 610, alone or in combination with computer instructions stored within memory 650, and/or one or more transceiver 620, implements the methods and mechanisms discussed in this disclosure. For example, processor 610, alone or in combination with computer instructions stored within memory 650, and/or one or more transceiver 220, implements mechanisms for configurations of resource elements to carry reference signals for a UE as shown in FIG. 1. According to some aspects of this disclosure, processor 610, alone or in combination with computer instructions stored within memory 650, and/or one or more transceiver 620, can send, to the base station, a coherence bandwidth of the channel, a coherence time of the channel, a preference associated with CSI-RS, or a preference associated with DMRS for the UE. In addition, processor 610 can receive, using the transceiver and from the base station, a configuration of resource elements to carry reference signals for the UE; and further perform DMRS or CSI-RS reference signal processing based on the configuration of resource elements to carry reference signals for the UE.

Figure 7:
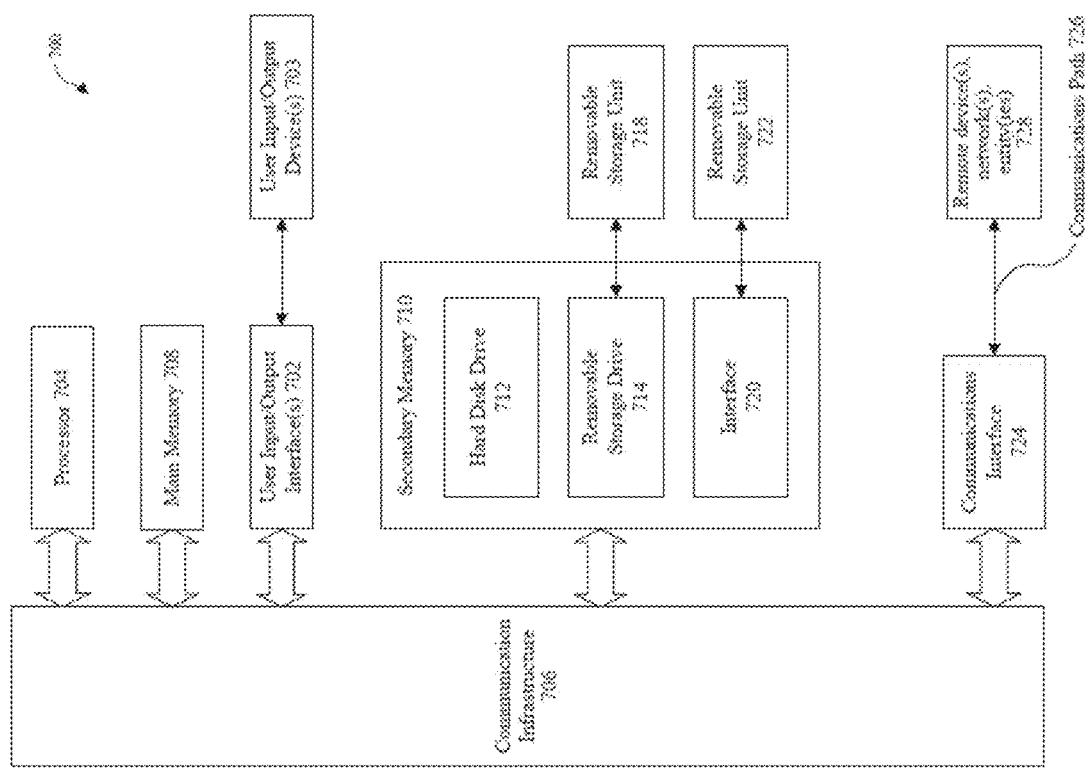
FIG. 7 is an example computer system for implementing some aspects or portion(s) thereof of the disclosure provided herein.

Various aspects can be implemented, for example, using one or more computer systems, such as computer system 700 shown in FIG. 7. Computer system 700 can be any well-known computer capable of performing the functions described herein such as devices 101, 105 of FIG. 1, or 600 of FIG. 6. Computer system 700 includes one or more processors (also called central processing units, or CPUs), such as a processor 704. Processor 704 is connected to a communication infrastructure 706 (e.g., a bus). Computer system 700 also includes user input/output device(s) 703, such as monitors, keyboards, pointing devices, etc., that communicate with communication infrastructure 706 through user input/output interface(s) 702. Computer system 700 also includes a main or primary memory 708, such as random access memory (RAM). Main memory 708 may include one or more levels of cache. Main memory 708 has stored therein control logic (e.g., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to some aspects, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

In some examples, main memory 708, the removable storage unit 718, the removable storage unit 722 can store instructions that, when executed by processor 704, cause processor 704 to perform operations for a UE, e.g., the UE 105, or a base station, e.g., the base station 101. In some examples, the operations include sending, to the base station, a coherence bandwidth of the channel, a coherence time of the channel, a preference associated with CSI-RS, or a preference associated with DMRS for the UE; receiving, from the base station, a configuration of resource elements to carry reference signals for the UE; and performing DMRS or CSI-RS reference signal processing based on the configuration of resource elements to carry reference signals for the UE. In addition, the operations include receiving, from the UE, a coherence bandwidth of the channel, a coherence time of the channel, a preference associated with CSI-RS, or a preference associated with DMRS for the UE; determining, based on the coherence bandwidth of the channel, the preference associated with CSI-RS, or the preference associated with DMRS, a configuration of resource elements to carry reference signals for the UE; and transmitting, to the UE, the configuration of resource elements to carry reference signals for the UE.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 700, main memory 708, secondary memory 710 and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 7. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments or examples, at least one of the components set forth in one or more of the preceding figures may be configured to perform one or more operations, techniques, processes, and/or methods as set forth in the example section below. For example, circuitry associated with a UE, base station, network element, etc. as described above in connection with one or more of the preceding figures may be configured to operate in accordance with one or more of the examples set forth below in the example section.

What is claimed is:

1. A user equipment (UE), comprising:
a transceiver configured to wirelessly communicate with a base station through a channel between the UE and the base station; and
a processor communicatively coupled to the transceiver and configured to:
send, using the transceiver and to the base station, a coherence bandwidth of the channel, a coherence time of the channel, a preference associated with a channel status information reference signal (CSI-RS), or a preference associated with a demodulation reference signal (DMRS) for the UE;
receive, using the transceiver and from the base station, a configuration of resource elements to carry reference signals for the UE, wherein the configuration is responsive to the coherence bandwidth of the channel, the coherence time of the channel, the preference associated with the CSI-RS, or the preference associated with the DMRS, and the configuration indicates a set of resource elements, and one or more orthogonal cover codes (OCCs) applied to at least a subset of the set of resource elements to carry the CSI-RS or the DMRS for one or more antenna ports of the UE; and
perform DMRS or CSI-RS reference signal processing based on the configuration of resource elements to carry reference signals for the UE.

2. The UE of claim 1, wherein the processor is configured to assign the subset of the set of resource elements or an OCC applied to the subset of the set of resource elements to an antenna port of the one or more antenna ports of the UE.

3. The UE of claim 1, wherein the processor is configured to receive a radio resource control (RRC) signal, a medium access control (MAC) control element (CE), or a downlink control information (DCI) to indicate the configuration of resource elements to carry reference signals for the UE.

4. The UE of claim 3, wherein the one or more OCCs applied to at least the subset of the set of resource elements for the one or more antenna ports are semi-statically configured by the RRC signal, or dynamically configured by the MAC-CE or the DCI.

5. The UE of claim 1, wherein the set of resource elements includes at least two adjacent resource elements at two consecutive sub-carriers in a frequency domain and a symbol in a time domain, or at least two adjacent resource elements at two consecutive sub-carriers in the frequency domain and two adjacent symbols in the time domain.

6. The UE of claim 5, wherein the one or more OCCs include frequency domain (FD) OCCs applied to the two adjacent resource elements at two consecutive sub-carriers in the frequency domain.

7. The UE of claim 5, wherein the one or more OCCs include time domain (TD) OCCs applied to the two adjacent resource elements of two adjacent symbols in the time domain.

8. The UE of claim 5, wherein the configuration of resource elements to carry reference signals for the UE indicates that only one or more frequency domain (FD) OCCs, or one or more time domain (TD) OCCs are applied, based on a relationship between a sub-carrier spacing (SCS) interval between the two consecutive sub-carriers at the frequency domain and the coherence bandwidth of the channel.

9. The UE of claim 5, wherein the subset of the set of resource elements having the one or more OCCs applied to is empty, and the configuration indicates no OCC is applied to the set of resource elements allocated to the one or more antenna ports of the UE.

10. The UE of claim 1, wherein the channel comprises one or more frequencies above 52 GHz.

11. The UE of claim 1, further comprising at least 2 antenna ports.

12. A base station, comprising:
a transceiver configured to communicate with a user equipment (UE) through a channel between the UE and the base station; and
a processor communicatively coupled to the transceiver and configured to:
receive, using the transceiver and from the UE, a coherence bandwidth of the channel, a coherence time of the channel, a preference associated with a channel status information reference signal (CSI-RS), or a preference associated with a demodulation reference signal (DMRS) for the UE;

determine, responsive to the coherence bandwidth of the channel, the coherence time of the channel, the preference associated with the CSI-RS, or the preference associated with the DMRS, a configuration of resource elements to carry reference signals for the UE, wherein the configuration indicates a set of resource elements, and one or more orthogonal cover codes (OCCs) applied to at least a subset of the set of resource elements to carry the CSI-RS or the DMRS for one or more antenna ports of the UE; and transmit, using the transceiver and to the UE, the configuration of resource elements to carry reference signals for the UE.

13. The base station of claim 12, wherein the processor is further configured to assign the subset of the set of resource elements or an OCC applied to the subset of the set of resource elements to an antenna port of the one or more antenna ports of the UE.

14. The base station of claim 12, wherein the processor is configured to transmit a radio resource control (RRC) signal, a medium access control (MAC) control element (CE), or a downlink control information (DCI) to indicate the configuration of resource elements to carry reference signals for the UE.

15. The base station of claim 14, wherein the one or more OCCs applied to at least the subset of the set of resource elements for the one or more antenna ports are semi-statically configured by the RRC signal, or dynamically configured by the MAC-CE or the DCI.

16. The base station of claim 12, wherein the set of resource elements includes at least two adjacent resource elements at two consecutive sub-carriers in a frequency domain and a symbol in a time domain, or at least two adjacent resource elements at two consecutive sub-carriers in the frequency domain and two adjacent symbols in the time domain.

17. The base station of claim 16, wherein the one or more OCCs include only frequency domain (FD) OCCs applied to the two adjacent resource elements at two consecutive sub-carriers in the frequency domain.

18. The base station of claim 16, wherein the one or more OCCs include only time domain (TD) OCCs applied to the two adjacent resource elements of two adjacent symbols in the time domain.

19. The base station of claim 16, wherein the subset of the set of resource elements for the one or more antenna ports having the one or more OCCs applied is empty, and the configuration indicates no OCC is applied to the set of resource elements allocated to the one or more antenna ports of the UE.

20. The base station of claim 12, wherein the channel comprises one or more frequencies above 52 GHz.

* * * * *